United States Patent [19]
Yamamoto et al.

[11] Patent Number: 5,239,478
[45] Date of Patent: Aug. 24, 1993

[54] METHOD FOR DETERMINING GROOVE MACHINING PROCESS BASED ON NUMERICAL CONTROL INFORMATION GENERATING FUNCTION

[75] Inventors: Kyoichi Yamamoto; Kenji Ito; Hiroki Tomita, all of Niwa, Japan

[73] Assignee: Kabushiki Kaisha Okuma Tekkosho, Aichi, Japan

[21] Appl. No.: 623,620

[22] Filed: Dec. 7, 1990

[30] Foreign Application Priority Data

Dec. 13, 1989 [JP] Japan ................. 1-323313

[51] Int. Cl.$^5$ ............................................. G06F 15/46
[52] U.S. Cl. ..................... 364/474.25; 364/191
[58] Field of Search ........... 364/188, 189, 191, 474.22, 364/474.24, 474.25

[56] References Cited

U.S. PATENT DOCUMENTS

| 4,530,046 | 7/1985 | Munekata et al. | 364/474.24 |
| 4,669,041 | 5/1987 | Kishi et al. | 364/474.28 |
| 4,723,203 | 2/1988 | Kishi et al. | 364/474.25 |
| 4,855,898 | 8/1989 | Kawamura et al. | 364/191 |
| 4,926,311 | 5/1990 | Matsumura et al. | 364/191 |
| 4,942,350 | 7/1990 | Seki et al. | 318/569 |
| 5,089,950 | 2/1992 | Miyata et al. | 364/191 |
| 5,099,432 | 3/1992 | Fukaya et al. | 364/474.25 |
| 5,172,327 | 12/1992 | Miyata et al. | 364/474.21 |

Primary Examiner—Jerry Smith
Assistant Examiner—Paul Gordon
Attorney, Agent, or Firm—Wenderoth, Lind & Ponack

[57] ABSTRACT

In a method for determining a groove machining process based on numerical control information generating functions, a groove machining process is automatically determined based on characteristics of shape elements adjacent to groove shape elements as well as the shapes of the groove shape elements. The groove machining process can therefore be easily optimized.

6 Claims, 7 Drawing Sheets

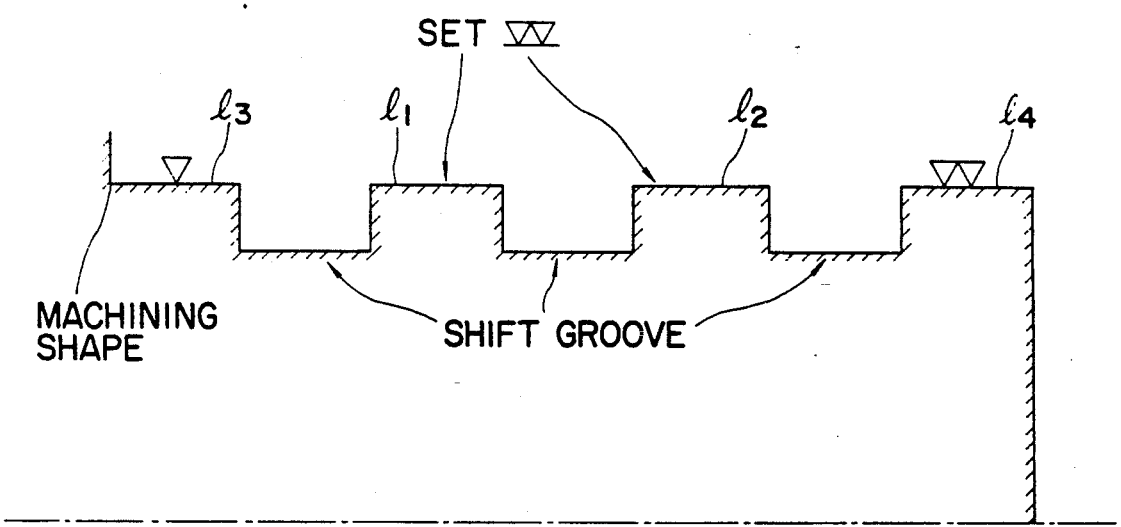
F I G. 4
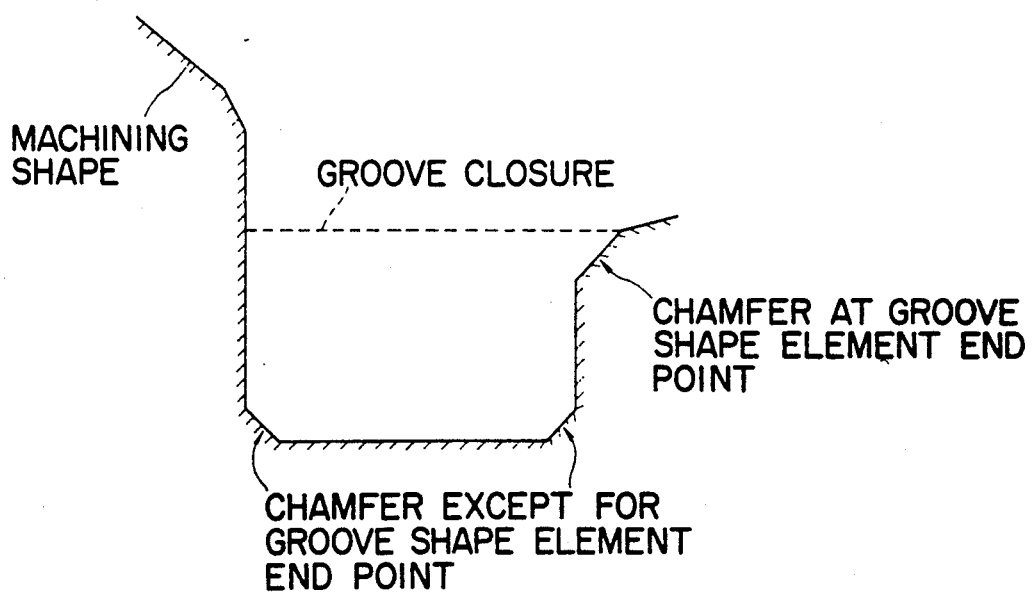
F I G. 8

METHOD FOR DETERMINING GROOVE MACHINING PROCESS BASED ON NUMERICAL CONTROL INFORMATION GENERATING FUNCTION

BACKGROUND OF THE INVENTION

1. Field of the Invention

This invention relates to a method for determining a groove machining process based on numerical control information generating functions whereby an information for the numerical control is generated before working and, more particularly, to a method for determining the kinds of steps, the order of steps and the extents of working of a groove working process.

2. Description of the Prior Art

When necessary data on design drawings is input by interactive operation using a graphic display, numerical control information generating functions for machining the numerical control information including a numerical control program are realized. The numerical control information generating functions enable the operator to input a work shape only by pressing a corresponding shape key in an operation panel in accordance with the shape of a corresponding part shown in the design drawings. The operator can also input various categories of data including size data according to displayed figures representing information referred to for data setting for the working process and according to inquiries in everyday language. Immediately after all of the data necessary for the preparation of the numerical control information has been input, the blank shape and the machining shape are drawn, and automatic calculation of numerical control data is started, and tool paths are displayed in figures, thereby generating the numerical control information.

The numerical control information generating functions include the following steps:
1: step of selecting the material of a blank,
2: step of selecting drawing forms,
3: step of inputting the shape and size of a blank,
4: step of inputting the shape and size of a work,
5: step of inputting a machine origin and bite holder positions,
6: step of selecting kinds of step,
7: step of selecting tools,
8: step of determining extents of machining,
9: step of inputting cutting conditions, and
10: step of calculating tool path.

According to these numerical control information generating functions, the operator determines, after inputting the blank shape and the machining shape, the combinations of regions to be machined, kinds of step and the directions in which tools are moved for machining, and also determines the step order. The operator inputs necessary data in accordance with this step order.

The above-described conventional method of determining a working process based on the numerical control information generating functions is advantageous in terms of adaptability because it allows the operator to freely set the step order and the extents of machining. For groove machining, however, the operator must be particularly skilled, because it is necessary for the operator to determine the kinds of tool by assuming suitable tools and to determine the step order and the extents of machining from the sizes of the groove shape elements, the relationship with other shape elements, and so on. It is difficult for an unskilled operator to perform these troublesome operations as well as setting various catergories of data. Also there is the problem of an increase in the inputting time since the names of process steps must be selected, the step order must be determined and data on the tool, the cutting direction, the extent of machining and cutting conditions must be input for each step.

SUMMARY OF THE INVENTION

The present invention has been achieved in consideration of these circumstances, and an object of the present invention is to provide a method for determining a groove machining process based on numerical control information generating functions which method enables the kinds of steps, the order of steps and the extents of machining of the groove machining process to be automatically determined without requiring the operator to examine the groove machining process before inputting data.

According to one aspect of this invention, for achieving the described above, there is provided a method for determining a groove machining process based on numerical control information generating functions of inputting the shape of a blank to be worked and the shape of a machining and preparing numerical control information from the blank shape and the machining shape, said method comprising the steps of: extracting shape elements designated to be processed by groove machining; and automatically determining kinds of step, step order and worked regions for the groove machining based on the shapes of the groove shape elements and characteristics of other adjacent shape elements.

The nature, principle and utility of the invention will become more apparent from the following detailed description when read in conjunction with the accompanying drawings.

BRIEF DESCRIPTION OF THE DRAWINGS

In the accompanying drawings:

FIGS. 3 to 8 are diagrams of an embodiment of this invention.

DESCRIPTION OF THE PREFERRED EMBODIMENT

Figure 1:
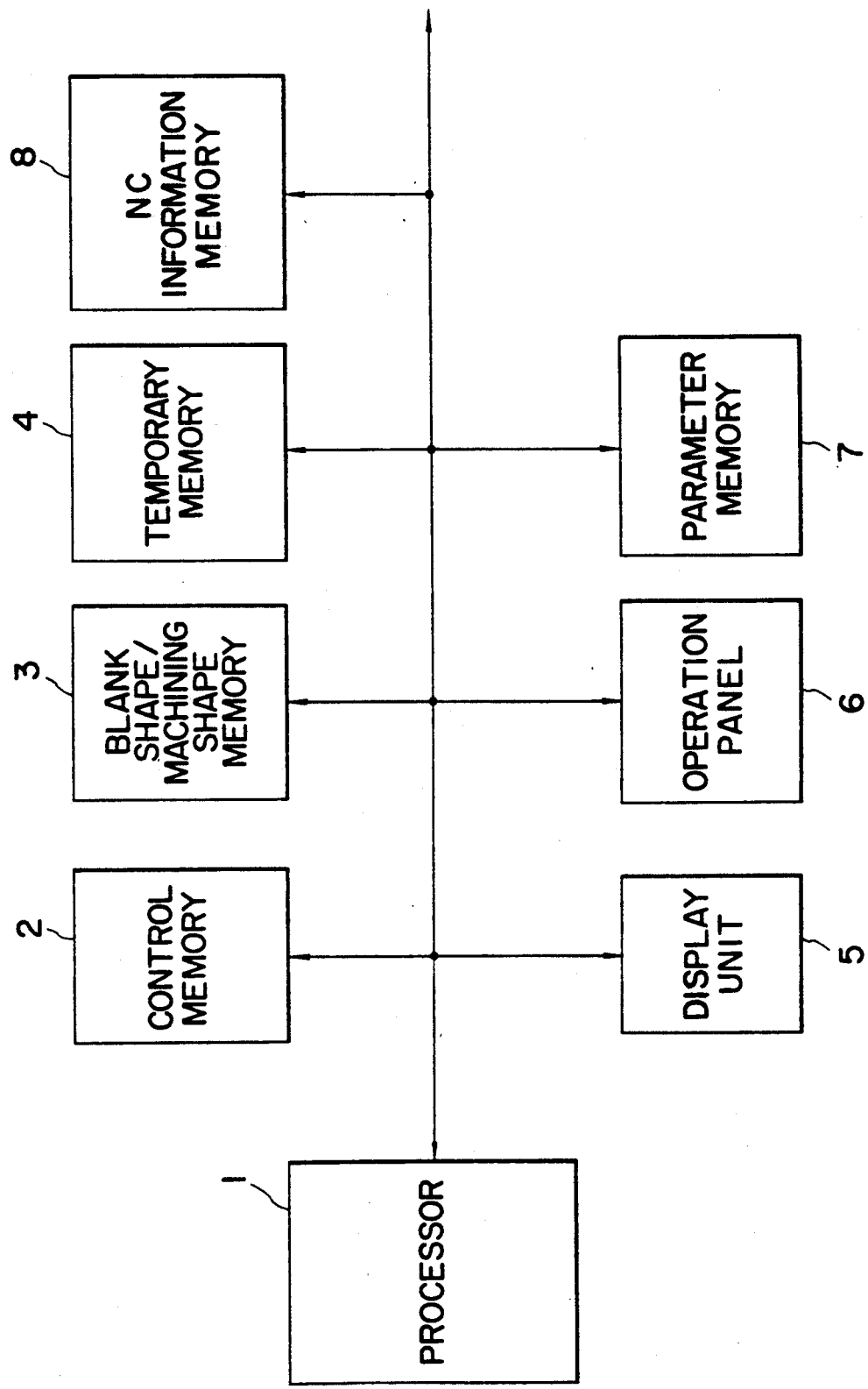
FIG. 1 is a block diagram of an example of an apparatus for realization of a method of determining a groove machining process based on numerical control information generating functions in accordance with this invention.
Figure 2A:
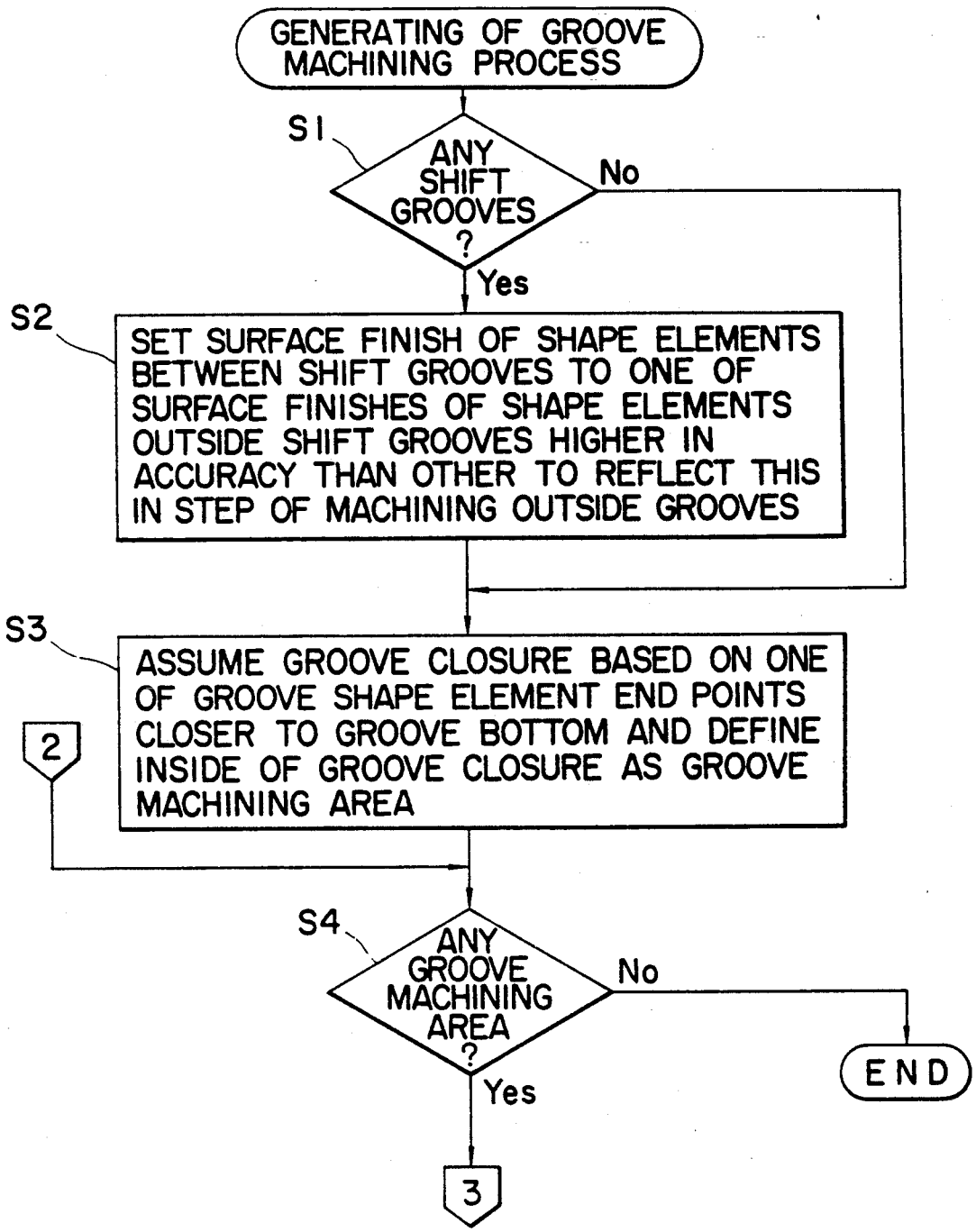
FIGS. 2A, 2B and 2C are flowcharts, of an example of the operation of a main component of the apparatus shown in FIG. 1.
Figure 2B:
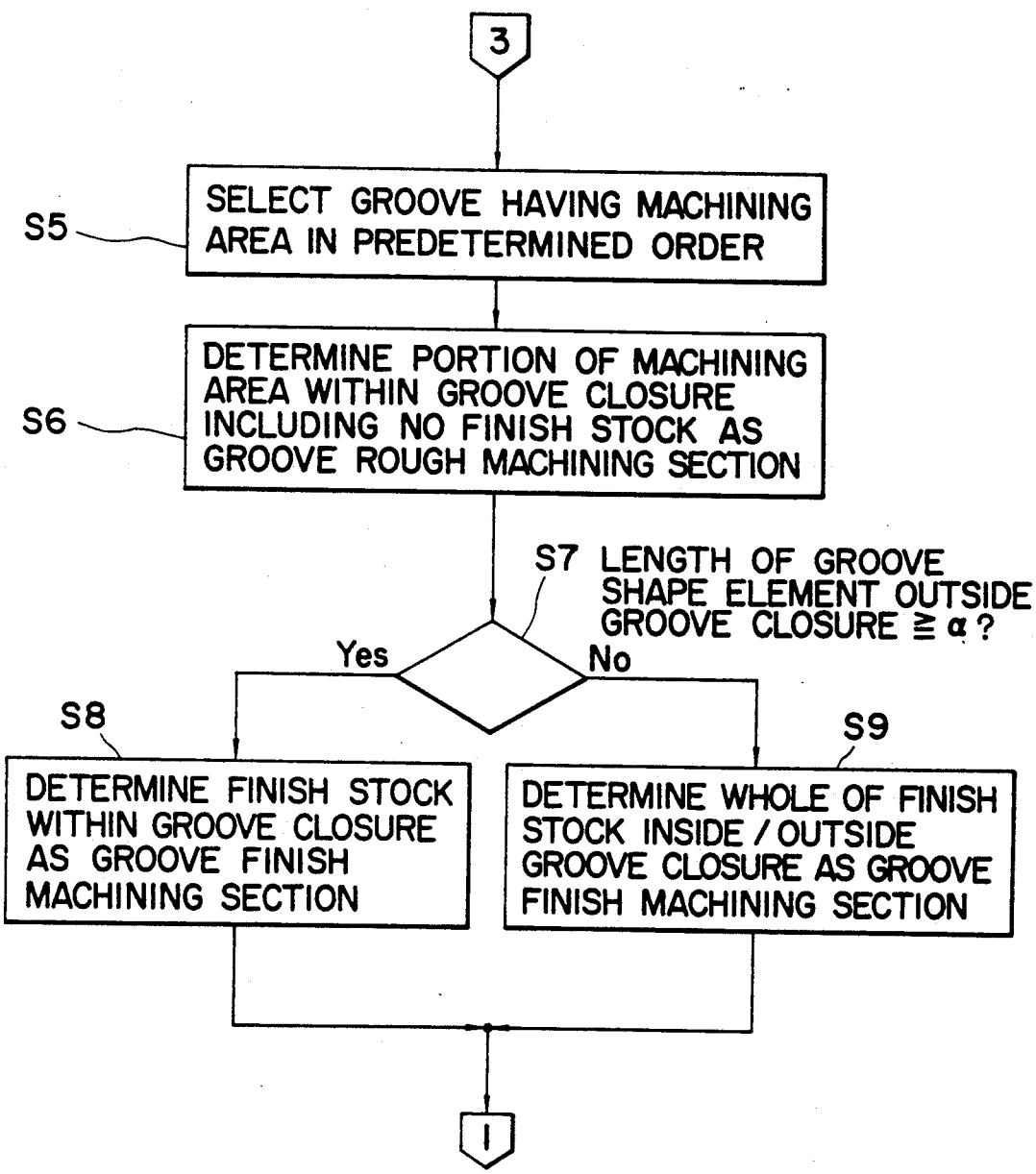
Figure 2C:
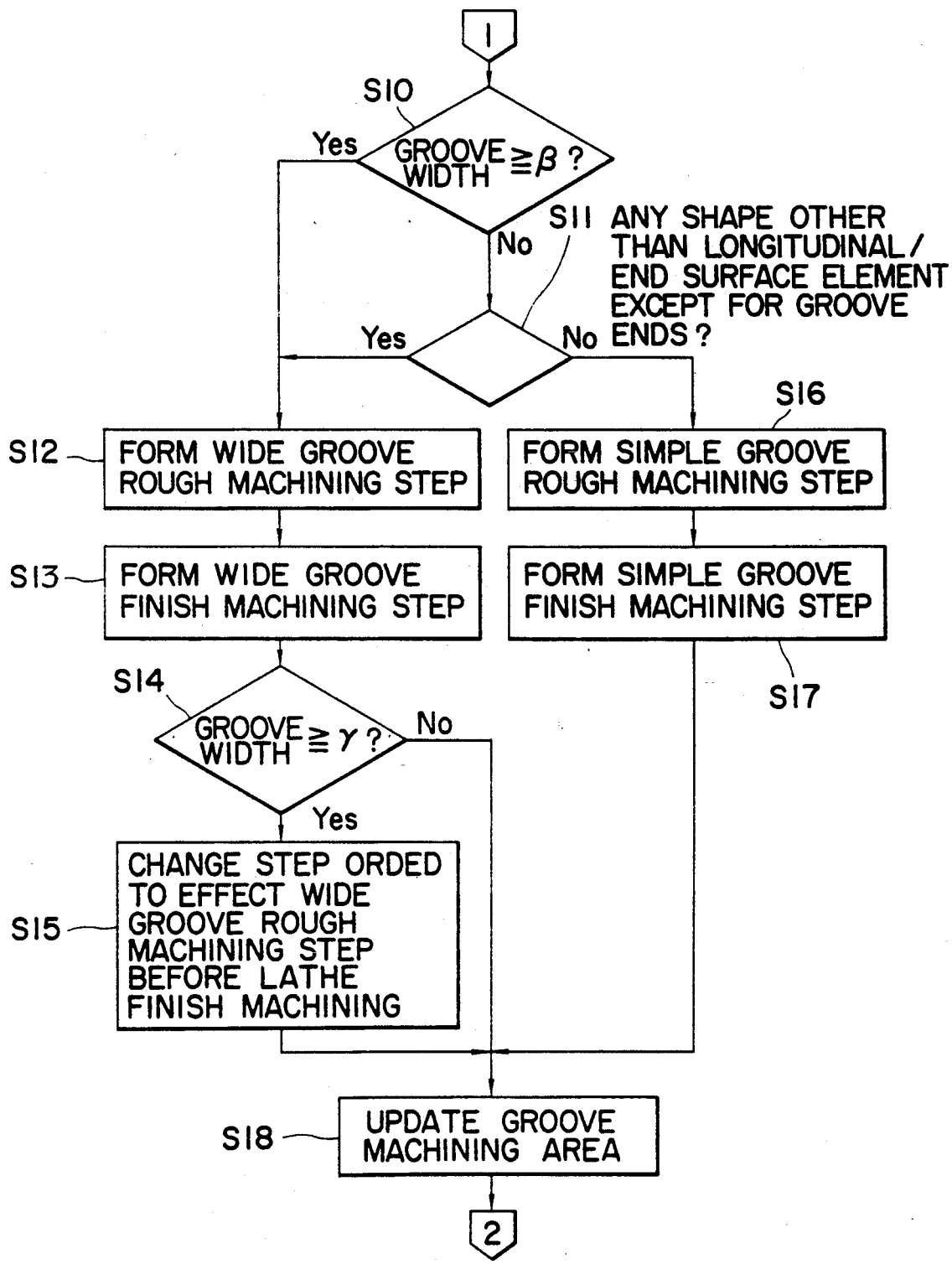

FIG. 1 is a block diagram of an example of the apparatus with which a method for determining a groove machining process based on numerical control information generating functions in accordance with this invention is realized, and FIGS. 2A, 2B and 2C are flowcharts of an example of the operation of a processor 1 which is a main component of this apparatus. An operator inputs the shape of a blank (work) and the shape of a machining (part) through an operation panel 6 while confirming the contents of the input by using a display unit 5. Then, the shapes of the blank and the machining are developed into series of shape elements which are stored in a blank shape/machining shape memory 3.

Figure 3:
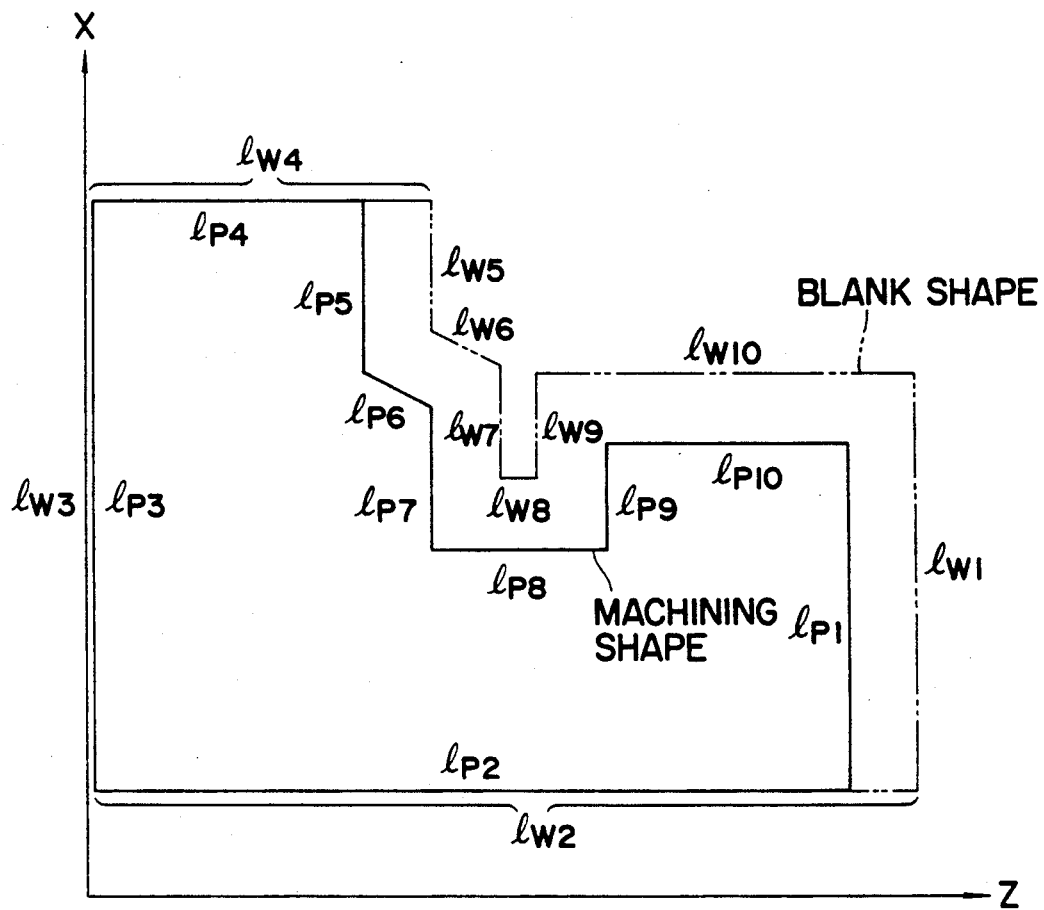
Figure 6:
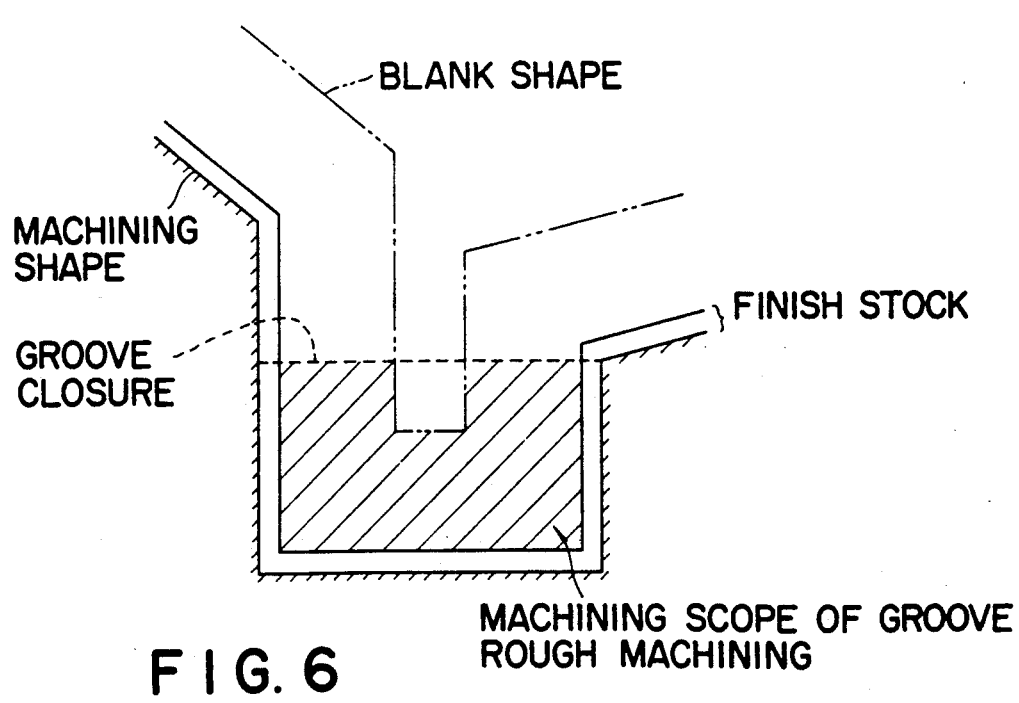

The series of shape elements are as described below. Referring to FIG. 3, for example, the blank shape has a series of blank shape elements $l_{w1}, l_{w2}, \ldots, l_{w10}$, while the machining shape has a series of machining shape elements $l_{p1}, l_{p2}, \ldots, l_{p10}$. Each element of the series of shape elements comprises data on the position, shape and size sufficient for specifying the figure.

The processor 1 extracts a series of shape elements designated to be processed by groove machining from the series of shape element based on a program stored in a control memory 2, and confirms whether or not the designated series of groove shape elements includes any series of elements which are designated to be machined to form a plurality of grooves having equal shapes and arranged to equal intervals (hereinafter referred to as "shift grooves") based on a single groove shape definition (Step S1). If there are such shift grooves, the process proceeds to the Step S2 or, if there are no shift grooves, the process proceeds to the Step S3.

In the Step S2, the surface finish of, for example, shape elements $l_1$ and $l_2$ located between shift grooves as shown in FIG. 4 is made to coincide with the surface finish "$\triangledown\triangledown$" which is one of the surface finishes "$\triangledown$, $\triangledown\triangledown$" of shape elements $l_3$ and $l_4$ located outside the two ends of the group of shape elements designated as the shift grooves, and which is higher in accuracy than the other surface finishes. This surface finish data can be utilized when steps for machining the shape elements located between the shift grooves are determined.

Figures 5A, 5B:
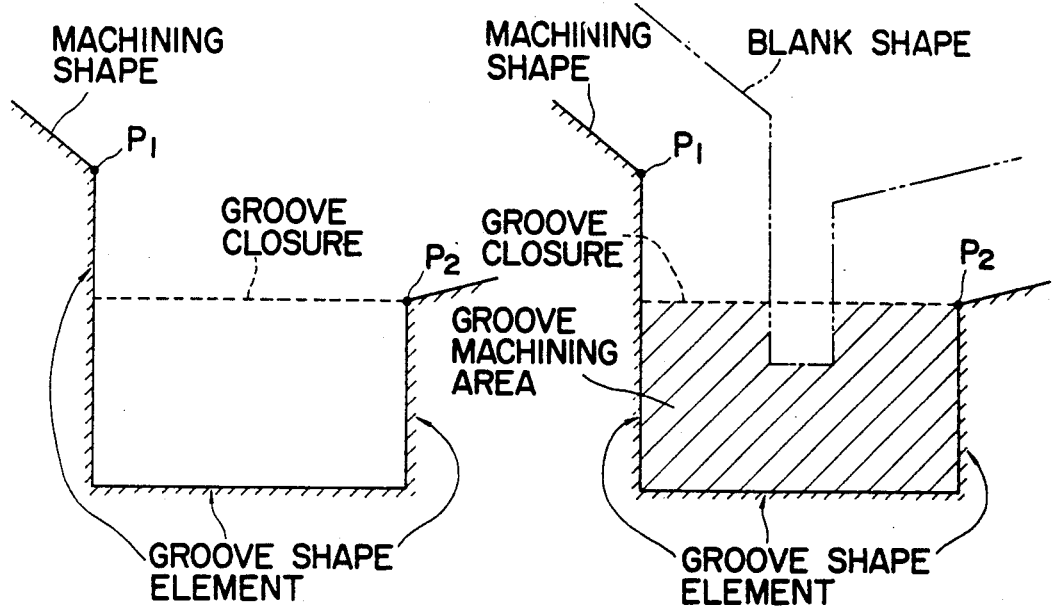

In the Step S3, with respect to coordinate values of, for example, two end points $P_1$ and $P_2$ of groove shape elements shown in FIG. 5A, a line which is perpendicular to the direction of groove machining depth and which is drawn from the end point $P_2$ closer to the groove bottom in the direction of groove machining depth to the groove machining shape element corresponding to the end point $P_1$ remoter from the groove bottom is defined as "groove closure", and the area surrounded by the groove shape elements and the groove closure is defined as "groove machining area", as shown in FIG. 5B.

In the Step S4, an examination is made to determine whether or not there is any groove machining area. If a groove machining area exists, the process proceeds to the Step S5 or, if there is no groove machining area, the process ends. The determination of whether or not there is any groove machining area is based on examining whether or not any series of shape elements remains after cancelling out overlapping of the series of blank shape elements and the series of machining shape elements.

In the Step S5, grooves having machining area are selected in predetermined order. The search for grooves to be selected is effected in order of end face groove, outside diametral groove and inside diametral groove and, with respect to end face grooves, in order from a groove closure to the center axis, and, with respect to outside or inside diametral grooves, in order from a groove remoter from the chuck, so that the machining process is optimized if it is performed in this selection order.

In the Step S6, a portion of the machining area within the grooves closure in a groove selected in the Step S5, which is defined by removing a finish stock, is determined to be a groove rough machining section.

In the Step S7, the length of the groove machining shape element located outside the groove closure is compared with a predetermined groove outside finishing decision value $\alpha$. If the length of the groove machining shape element located outside the groove closure is equal to or greater than the groove outside finishing decision value $\alpha$, it is determined that the length of the element outside the groove closure is substantially long, and the process proceeds to the Step S8. If the length of the groove machining shape element located outside the groove closure is smaller than the groove outside finishing decision value $\alpha$, it is determined that finishing based on groove machining is also suitable for the element outside the groove closure, and the process proceeds to the Step S9.

Figures 7A, 7B:
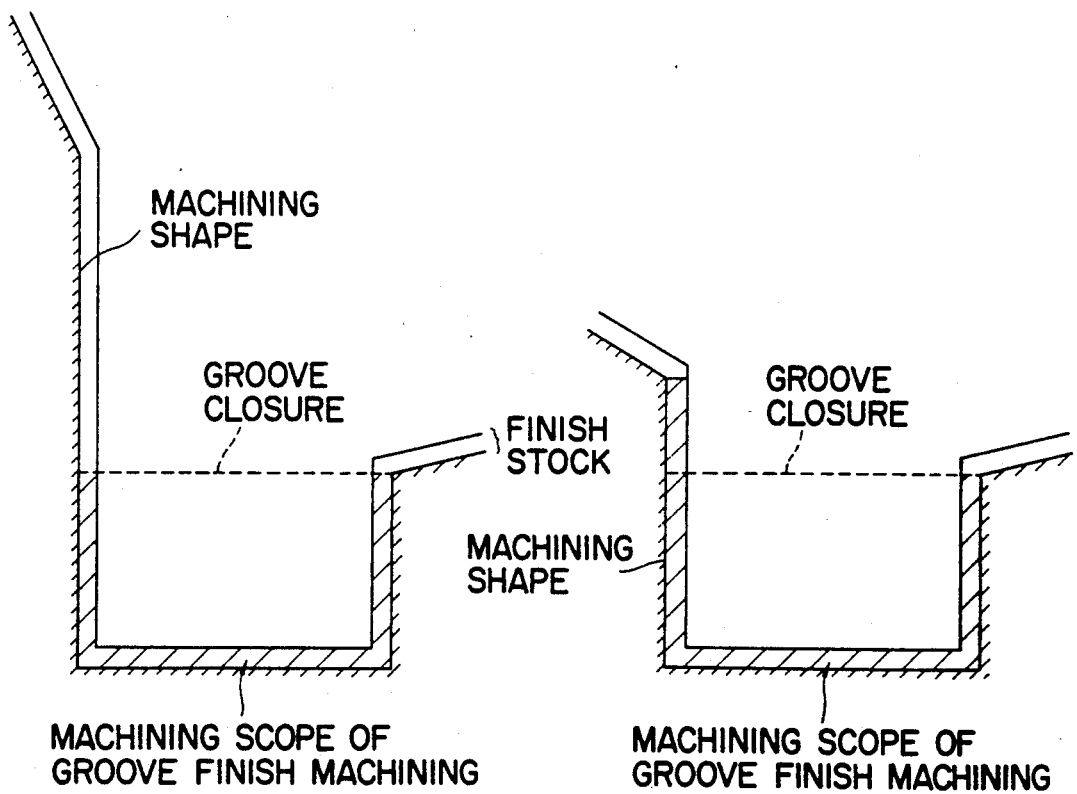

In the Step S8, only the finish stock within the groove closure is determined to be a groove finish machining section, as shown in FIG. 7A.

In the Step S9, the whole of the finish stock including the portions within and outside the groove closure is determined to be a groove finish machining section, as shown in FIG. 7B.

In the Step S10, the length of the groove closure (hereinafter referred to as "groove width") is compared with a predetermined single groove width maximum $\beta$. If the groove width is equal to or greater than the single groove width maximum, it is determined that it is appropriate to form a machining step using a tool having a width smaller than the groove width, and the process proceeds to the Step S12. If the groove width is smaller than the single groove width maximum, the process proceeds to the Step S11.

In the Step S11, an examination is made to determine whether or not there is any element other than end surface and longitudinal elements, e.g., rounding or chamfer, such as the one shown in FIG. 8, remote from the end points of the groove machining shape elements within the groove closure. If there is some element other than the end surface and longitudinal elements, it is determined that it is appropriate to form a machining step using a tool having a width smaller than the groove width, and the process proceeds to the Step S12. If there is no element other than the end surface and longitudinal elements, it is determined that it is appropriate to form a machining step using a tool having a width equal to the groove width for machining of both the groove width and the shape, and the process proceeds to the Step S16. In the Step S12, a kind of step for wide groove roughing is determined, this kind of step and the machining section determined in the Step S6 are stared in a temporary memory 4, and the process proceeds to the Step S13.

In the Step S13, a kind of step for wide groove finishing is determined, and this kind of step and the machining section determined in the Step S8 or S9 are stored, in the temporary memory 4, and the process proceeds to the Step S14.

In the Step S14, the groove width is compared with a predetermined large groove width decision value $\gamma$. If the groove width is equal to or greater than the large groove width decision value, the time when this rough groove machining step is effected is changed to a time before a lathe finish machining step to avoid occurrence of finishing of a groove closure portion cut off through an unnecessarily long distance. If the groove width is smaller than the large groove width decision value, it is determined that the distance of unnecessary finishing is substantially small, and the process proceeds to the Step S18 without changing the machining step order.

In the Step S16, a kind of step for simple groove roughing is determined, and this kind of step and the machining section determined in the Step S6 are stored in the temporary memory 4, and the process proceeds to the Step S17.

In the Step S17, a kind of step for simple groove finishing is determined, and this kind of step and the machining section determined in the Step S8 or S9 are stored in the temporary memory 4, and the process proceeds to the Step S18.

In the Step S18, the groove machining sections determined in the Step S6, S8 and S9 are removed from the groove machining area to update the groove machining area, and the process returns to the Step S4 to repeat the above-described operations.

Thereafter, the processor 1 forms the control information for the groove machining based on the information on the kinds of step and the machining sections stored in the temporary memory 4 and the information on machining conditions and kinds of tool obtained from information previously stored in parameter memory 7 or automatically determined by the processor 1, and stores this numerical control information in a numerical control information memory 8. The operator can perform the desired groove machining by using the numerical control information stored in the numerical control information memory 8. In the above-described process, a lathe machining step may be formed after execution of the Steps S1 to S3, and the Steps S4 to S8 may thereafter be executed, thereby determining the machining order and machining area sections while optimizing matching between groove machining steps and lathe machining step.

As described above, in the method for determining a groove machining process based on the numerical control information generating functions in accordance with this invention, the kinds of steps, the step order and the machining area sections can be automatically determined according to the shape of groove shape elements and characteristics of adjacent shape elements even if the groove machining method is examined by the operator before data input. It is thereby possible even for a person unskilled in groove machining to easily determine the groove machining method and to enable a substantial reduction in the number of overall process steps.

It should be understood that many modifications and adaptations of the invention will become apparent to those skilled in the art and it is intended to encompass such obvious modifications and changes in the scope of the claims appended hereto.

What is claimed is:

1. A method for determining a groove machining process based on numerical control information generating functions of inputting a shape of a blank to be worked and a shape of a machining and generating the numerical control information from the blank shape and the machining shape, said method comprising the steps of:

extracting shape elements designated to be processed by groove machining; and automatically determining kinds of step, step order and machined area for the groove machining based on the shapes of the groove shape elements and characteristics of other adjacent shape elements;

wherein, if the width of a machining shape element of the groove shape elements is equal to or greater than a predetermined value, a wide groove machining step using a tool having a width smaller than the width of the machining shape element is provided as a kind of step for the groove machining, or, if the width of the machining shape element is smaller than the predetermined value, a simple groove machining step using a tool having a width equal to the width of the machining shape element is provided as a kind of step for the groove machining.

2. A method for determining a groove machining process based on numerical control information generating functions of inputting a shape of a blank to be worked and a shape of a machining and generating the numerical control information from the blank shape and the machining shape, said method comprising the steps of:

extracting shape elements designated to be processed by groove machining; and automatically determining kinds of step, step order and machined area for the groove machining based on the shapes of the groove shape elements and characteristics of other adjacent shape elements;

wherein, if there is a rounding element or a chamfer element among machining shape elements of the groove shape elements, a wide groove step is provided as a kind of step for the groove machining, or, in the absence of a rounding or chamfer element among the machining shape elements, a simple groove step is provided as a kind of step for the groove machining.

3. A method for determining a groove machining process based on numerical control information generating functions of inputting a shape of a blank to be worked and a shape of a machining and generating the numerical control information from the blank shape and the machining shape, said method comprising the steps of:

extracting shape elements designated to be processed by groove machining; and automatically determining kinds of step, step order and machined area for the groove machining based on the shapes of the groove shape elements and characteristics of other adjacent shape elements;

wherein, if the width of a machining shape element of the groove shape elements is equal to or greater than a predetermined value, it is determined that the width of the machining shape element is so large that a distance of unnecessary lathe machining in finish machining is long, and the time when a step of rough groove machining shape elements is to be effected is set to be before the finish machining.

4. A method for determining a groove machining process based on numerical control information generating functions of inputting a shape of a blank to be worked and a shape of a machining and generating the numerical control information from the blank shape and the machining shape, said method comprising the steps of:

extracting shape elements designated to be processed by groove machining; and automatically determining kinds of step, step order and machined area for the groove machining based on the shapes of groove shape elements and characteristics of other adjacent shape elements;

wherein at least one of machining shape elements adjacent to the machining shape elements of the groove shape elements is an object of lathe machining and if the groove machining shape elements have two end points and if the coordinate values of the two end points of the groove machining shape elements in a direction of groove working depth do not coincide with each other, a region surrounded by the groove shape elements and a line which is the perpendicular to one of the end points having the coordinate value closer to a groove bottom in a direction of groove machining depth on the groove machining shape element corresponding to the other end point remote from the groove bottom is set as an area to be rough machined.

5. A method for determining a groove machining process based on numerical control information generating functions according to claim 4, wherein, if the length of a portion of a machining shape element of the groove machining elements located outside the area to be rough machined is equal to or longer than a predetermined value, the portion of the groove shape element is set as an area to be machined by lathe finish machining, or if the length of the machining shape element portion is smaller than a predetermined shape, the portion of the groove shape element is included in the area to be machined by groove finishing.

6. A method for determining a groove machining process based on numerical control information generating functions of inputting a shape of a blank to be worked and a shape of a machining and generating the numerical control information from the blank shape and the machining shape, said method comprising the steps of:

extracting shape elements designated to be processed by groove machining; and automatically determining kinds of step, step order and machined area for the groove machining based on the shapes of the groove shape elements and characteristics of other adjacent shape elements;

wherein, if the groove shape elements are designated to be processed to form a plurality of grooves having equal shapes and are arranged at equal intervals based on a single groove shape definition, the surface finish of machining shape elements between shift machining groove elements is set to one of the surface finishes of other machining shape elements located outside the group of groove machining shape elements, and wherein one of the surface finishes is higher in accuracy than the other surface finishes.

* * * * *